(12) United States Patent
Diss et al.

(10) Patent No.: US 9,126,873 B2
(45) Date of Patent: Sep. 8, 2015

(54) PROCESS FOR PRODUCING A SELF-HEALING LAYER ON A PART MADE OF A C/C COMPOSITE

(75) Inventors: Pascal Diss, Le Haillan (FR); Eric Lavasserie, Begles (FR)

(73) Assignee: SNECMA PROPULSION SOLIDE, Le Haillan Cedex (FR)

( * ) Notice: Subject to any disclaimer, the term of this patent is extended or adjusted under 35 U.S.C. 154(b) by 952 days.

(21) Appl. No.: 12/996,294

(22) PCT Filed: Jun. 5, 2009

(86) PCT No.: PCT/FR2009/051065
§ 371 (c)(1),
(2), (4) Date: Mar. 11, 2011

(87) PCT Pub. No.: WO2010/001021
PCT Pub. Date: Jan. 7, 2010

(65) Prior Publication Data
US 2011/0311804 A1    Dec. 22, 2011

(30) Foreign Application Priority Data
Jun. 6, 2008    (FR) ...................... 08 53756

(51) Int. Cl.
*B32B 9/00* (2006.01)
*B32B 19/00* (2006.01)
*B32B 9/04* (2006.01)
(Continued)

(52) U.S. Cl.
CPC ........... *C04B 41/5089* (2013.01); *C04B 41/009* (2013.01); *C04B 41/85* (2013.01); *F02K 9/974* (2013.01); *F16D 69/028* (2013.01); *C04B 2111/00362* (2013.01); *C04B 2111/00982* (2013.01); *F05D 2300/60* (2013.01); *F05D 2300/603* (2013.01); *Y10T 428/252* (2015.01)

(58) Field of Classification Search
CPC .............. C04B 41/009; C04B 41/5045; C04B 41/5089; F02K 9/974
USPC ................... 428/325, 448, 220, 698, 701, 702
See application file for complete search history.

(56) References Cited

U.S. PATENT DOCUMENTS

| 4,613,522 | A | * | 9/1986 | Vasilos | ......................... 427/202 |
| 4,931,413 | A | * | 6/1990 | Weir et al. | ....................... 501/31 |
| 5,420,084 | A |   | 5/1995 | Morel |  |

(Continued)

FOREIGN PATENT DOCUMENTS

| EP | 0 609 160 A | 8/1994 |
| FR | 2 838 071 A | 10/2003 |

OTHER PUBLICATIONS

International Search Report as issued for PCT/FR2009/051065, dated Dec. 23, 2009.

*Primary Examiner* — Jonathan Langman
(74) *Attorney, Agent, or Firm* — Pillsbury Winthrop Shaw Pittman LLP

(57) ABSTRACT

In order to provide a self-healing layer on a composite material part, a composition is applied to the part, the composition containing: a suspension of colloidal silica; boron or a boron compound in powder form; silicon carbide in powder form; and at least one ultra-refractory oxide.

9 Claims, 3 Drawing Sheets

(51) Int. Cl.
  *B32B 18/00* (2006.01)
  *C04B 41/50* (2006.01)
  *C04B 41/00* (2006.01)
  *C04B 41/85* (2006.01)
  *F02K 9/97* (2006.01)
  *F16D 69/02* (2006.01)
  *C04B 111/00* (2006.01)

(56) References Cited

U.S. PATENT DOCUMENTS 6,740,408 B2    5/2004   Thebault et al.
2003/0194574 A1*   10/2003   Thebault et al. .............. 428/472
2007/0026153 A1*   2/2007   Nicolaus et al. ........... 427/372.2

\* cited by examiner

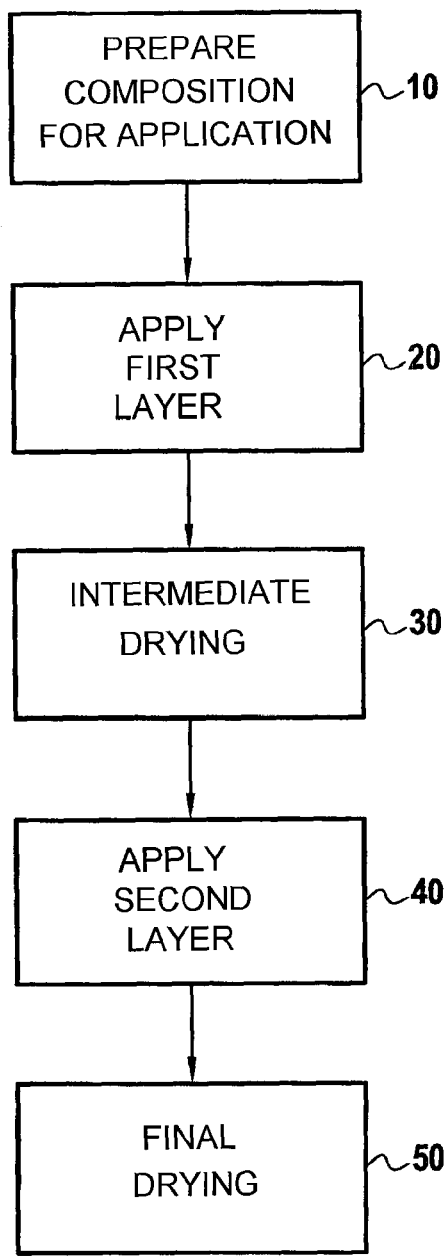
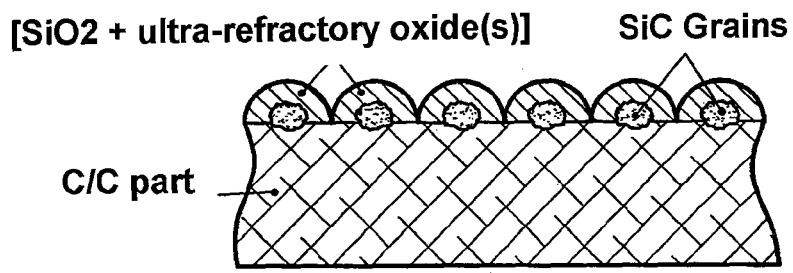
FIG.1
FIG.2

US 9,126,873 B2

PROCESS FOR PRODUCING A SELF-HEALING LAYER ON A PART MADE OF A C/C COMPOSITE

CROSS-REFERENCE TO RELATED APPLICATIONS

This application is the U.S. National Stage of PCT/FR2009/051065, filed Jun. 5, 2009, which in turn claims priority to French Application No. 08/53756, filed Jun. 6, 2008. The content of both applications are incorporated herein by reference in their entirety.

BACKGROUND OF THE INVENTION

The invention relates to applying a coating for providing protection against oxidation on parts made of thermostructural composite materials that contain carbon.

Thermostructural composite materials are characterized by their mechanical properties that make them suitable for constituting structural parts, and by their ability to retain these mechanical properties at high temperatures. They are constituted by fiber reinforcement densified by a matrix of refractory material that fills the pores within the fiber reinforcement at least in part. The materials constituting the fiber reinforcement and the matrix are typically selected from carbon and ceramics. Examples of thermostructural composite materials are carbon/carbon (C/C) composites and ceramic matrix composites (CMCs) such as C/SiC (carbon fiber reinforcement and silicon carbide matrix) or C/C—SiC (carbon fiber reinforcement and a matrix both of carbon and of silicon carbide), or indeed C/C—SiC—Si (C/C composite silicided by reacting with Si).

Very frequently, thermostructural composite materials contain carbon, whether constituting fibers, constituting at least part of the matrix, or indeed constituting an interphase layer formed on the fibers to provide sufficient bonding with the matrix. Thus, it is essential to provide protection against oxidation in order to avoid rapid deterioration of parts made of such composite materials when such parts are used in an oxidizing atmosphere at a temperature higher than 350° C.

There exists abundant literature concerning the formation of anti-oxidation protective coatings for parts made at least in part out of carbon or graphite.

For parts made of thermostructural composite materials containing carbon, in particular C/C composites, it is known to form a protective coating made at least in part from a composition containing boron, and more particularly a composition having self-healing properties. The term "self-healing" is used of a composition to mean that by passing to a viscous state at the utilization temperature of the part, it serves to plug any cracks that form in the coating or the protective layer. Otherwise, in an oxidizing atmosphere, such cracks give access to the oxygen in the surroundings to reach the composite material and to infiltrate into the residual pores thereof. Commonly-used self-healing compositions are boron glasses, in particular borosilicate glasses. By way of example, reference may be made to document U.S. Pat. No. 4,613,522.

The oxide $B_2O_3$ is the essential element of boron protective compositions. It possesses a relatively low melting temperature (about 450° C.) and its presence provides adequate ability to wet the carbon surface that is to be protected. When conditions of use require the use of specific self-healing vitreous mixtures, formulated so as to possess appropriate viscosity in an intended temperature range, it is essential to combine such mixtures with $B_2O_3$ in order to form a continuous protective film on the surface of the substrate.

Depending on the conditions of use, $B_2O_3$ may volatilize, either progressively as from 500° C. (in particular in a wet atmosphere), or more rapidly at higher temperatures. Above 1100° C. volatization becomes so fast that the effectiveness of the protective mixtures present disappears as a result of losing wetting ability, even for uses of very short duration.

One way of slowing down the complete disappearance of $B_2O_3$ consists in adding metallic borides into the protective composition, which borides are capable of reforming $B_2O_3$ progressively by oxidation, as the existing $B_2O_3$ volatilizes. Document U.S. Pat. No. 5,420,084 describes a protective coating serving in particular to protect C/C composite material parts against oxidation up to 1350° C., the protective coating being formed by a mixture of zirconium diboride $ZrB_2$ and colloidal silica $SiO_2$.

A method is also known from document U.S. Pat. No. 6,740,408 for forming a protective coating for C/C composite material parts. That method comprises forming on the part a coating that contains a mixture of a boride powder constituted in the majority by titanium diboride $TiB_2$, by a powder of a refractory oxide preventing healing properties by forming a silicate glass, and containing in the majority a borosilicate mixture (such as a powder of an $SiO_2$-$B_2O_3$ mixture), and by a binder constituted by a refractory ceramic precursor resin (e.g. a resin selected from polycarbosilanes (PCS), precursors of silicon carbide SiC; and polytitanocarbosilanes (PCTS)), the precursor then being transformed into a ceramic. Titanium diboride $TiB_2$ constitutes a $B_2O_3$ regenerator. This is because on oxidizing, progressively as from 550° C., and more quickly as from 1100° C., $TiB_2$ compensates for the disappearance of $B_2O_3$ by generating $B_2O_3$+$TiO_2$. The $TiO_2$ oxide disperses in the oxides of the silicate glass and contributes to increasing viscosity while maintaining its healing power. The protective layer as obtained in this way thus provides effective and durable protection against oxidation for C/C composite parts used in a wet environment at high temperature.

Nevertheless, the effectiveness of the protection of known coatings having self-healing properties is no longer ensured at temperatures greater than about 1450° C., even for coatings that contain $B_2O_3$ regenerators such as titanium diboride $TiB_2$ or zirconium diboride $ZrB_2$. Above 1450° C., it is observed that the oxide $B_2O_3$ volatilizes completely, including the oxide obtained by regeneration. Under such conditions, it is no longer possible to form a continuous protective film on the surface of the part, in particular because of insufficient ability to wet carbon. The loss of the effectiveness of protection at such temperatures is even greater when the part is exposed for a long duration.

Although it is relatively easy to devise vitreous mixtures capable of softening at temperatures higher than 1450° C. in order to perform a healing role, the direct use of such mixtures is unfortunately not possible because of the absence of $B_2O_3$ at such temperature levels, thus leading to the protective system losing the ability to wet carbon.

The solution that is generally adopted under such circumstances consists in applying the protective mixture onto a surface of silicon carbide (SiC) instead of a surface of carbon. That requires an SiC primer underlayer to be formed that is obtained either by a reaction technique in which silicon is caused to react chemically with the carbon surface that is to be protected (T<1400° C., argon atmosphere), or else by chemical vapor infiltration (CVI).

The preparation of such an underlayer thus constitutes an additional step in forming the protective coating, which step is additionally highly complex, given the operating conditions involved.

There exists a need to provide protection for parts used in an oxidizing atmosphere at temperatures higher than 1450° C.

This applies in particular to the diverging portions of nozzles for hydrogen and oxygen rocket engines where the water vapor produced and ejected through the nozzle creates an environment that is wet and oxidizing.

This also applies to C/C composite brake disks of the kind used in aviation, when landing and taxiing on wet runways.

OBJECT AND SUMMARY OF THE INVENTION

An object of the invention is to provide a method of enabling a self-healing layer on a composite material part in a single forming step, which layer presents good effectiveness, in particular at temperatures higher than 1450° C.

This object is achieved by a method that comprises applying a composition on the part, the composition containing:
- a suspension of colloidal silica;
- boron or a boron compound in powder form;
- silicon carbide in powder form; and
- at least one ultra-refractory oxide.

As explained below, such a composition enables a protective coating to be formed that comprises two self-healing phases: a first phase that provides protection against oxidation at temperatures below 1450° C.; and a second phase that provides protection against oxidation at temperatures above 1450° C. In addition, the silicon carbide grains co-operate with the second self-healing phase to form a continuous protective film on the surface of the part. Consequently, the composition of the present invention provides protection against oxidation that is effective, even at temperatures higher than 1450° C. and in spite of boron disappearing at these temperature levels, and in spite of there being no SiC underlayer.

The composition may contain silicon in powder form serving to trap oxygen and form additional silica.

In addition to the boron and the silica that are already present, the composition may contain a borosilicate mixture in powder form.

A glass-modifier oxide may also be added in order to adapt the temperature at which the protective glass forms.

The applied composition is preferably dried at 90° C. in air for a duration of about one hour.

Advantageously, a composition is applied on the part, which composition presents, after drying, a layer having a mean thickness lying in the range 50 micrometers (μm) to 250 μm and a surface density lying in the range 15 milligrams per square centimeter (mg/cm$^2$) to 60 mg/cm$^2$.

Also advantageously, the composition is applied to the part as a plurality of successive layers, with intermediate drying.

Optionally, the method may further comprise, after applying the composition, applying a layer of a carbon resin or a ceramic-precursor resin, and polymerizing said resin, or performing lapping-vitrification heat treatment at a temperature lying in the range 600° C. to 1000° C. in an inert atmosphere. This does not change in any way the effectiveness of the protection compared with drying at 90° C., but serves to protect the composition against potential impacts, friction, etc.

The present invention also provides a composite material part having a a self-healing layer as obtained by the method of the invention and comprising a first self-healing phase formed in the majority by a borosilicate system, and a second self-healing phase based on silicate, and a filler formed by silicon carbide grains, said second self-healing phase including at least one ultra-refractory oxide.

The self-healing layer may also include one or more of the following ingredients: silicon in powder form; a borosilicate mixture in powder form; and at least one glass-modifier oxide.

The part may also include a mechanical protection surface layer on the anti-oxidation protection coating.

The part may in particular be a C/C composite friction part or a diverging portion for a rocket engine nozzle.

BRIEF DESCRIPTION OF THE DRAWINGS

The invention can be better understood in the light of the following detailed description given by way of non-limiting indication. Reference is made to the accompanying drawings, in which:

FIG. 1 shows the successive steps of forming a self-healing layer in an implementation of the invention;

FIG. 2 is a diagram showing the function of the SiC grains present in the self-healing layer of the invention.

DETAILED DESCRIPTION OF IMPLEMENTATIONS

Figure 3:
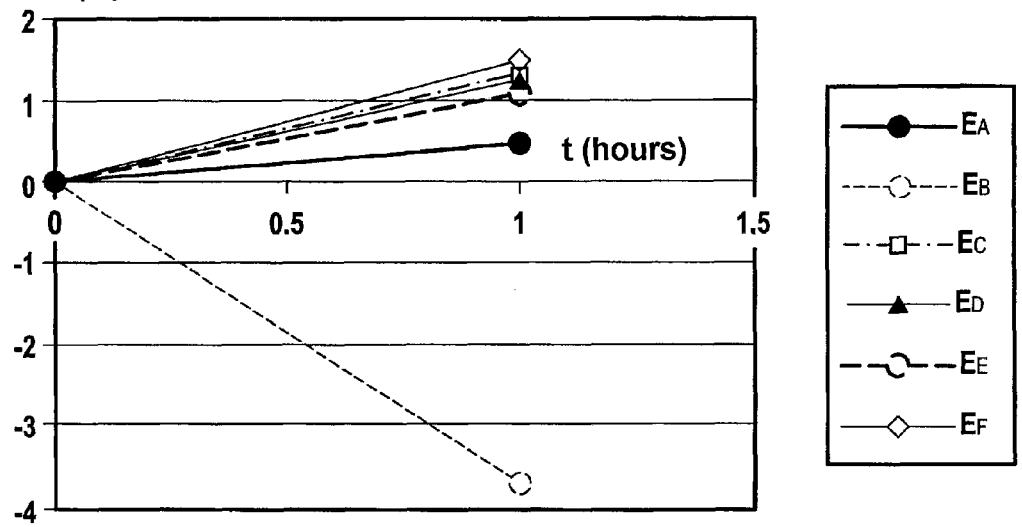
FIGS. 3 to 5 are graphs showing the protective coating contents obtained in accordance with the invention in an oxidizing atmosphere at temperatures of 1500° C.

The invention is described below with reference to FIG. 1 and in the context of its application to protecting parts made of C/C composite material against oxidation. A particular application of the invention lies in protecting C/C composite material parts that are to be exposed to high temperatures, as happens in particular with the diverging portions of rocket engine nozzles and with friction parts such as airplane brake disks.

Nevertheless, as mentioned above, the invention may be applied to any thermostructural composite material that includes carbon, and in particular CMCs including carbon fiber reinforcement or presenting a carbon interphase between reinforcing fibers and the ceramic matrix, e.g. made of SiC.

A first step 10 of the method consists in preparing the composition for applying to the surface of the parts to be protected.

The composition comprises the following percentages by weight:
- 30% to 70% of an aqueous suspension of colloidal silica such as the product Ludox® AS40 from the supplier Grace Davison;
- 5% to 60% of a boron powder and/or of a powder of a boron compound selected in particular from metallic diborides (TiB$_2$, ZrB$_2$, etc.) or from boron oxides (B$_2$O$_2$, etc.);
- 15% to 40% of silicon carbide powder;
- 1% to 10% of one or more ultra-refractory oxides (Y$_2$O$_3$, HfO$_2$, Al$_2$O$_3$, ZrO$_2$, etc.);
- optionally 5% to 15% silicon powder;
- optionally 5% to 20% of a borosilicate glass ingredient in finely divided (powder) form comprising a majority of boron oxide and of silicon oxide; and
- optionally 1% to 10% of one or more glass-modifier oxides in powder form.

The aqueous suspension of the colloidal silica acts as a binder for the other ingredients of the composition, which are in powder form.

Preferably after being homogenized by stirring, the composition forms a slip that is applied to the surface of the part that is to be protected, where application may be performed by coating using a brush or a spray gun, for example. After application, the composition is dried in a stove. Application may be performed as a plurality of successive layers, e.g. two layers (steps 20 and 40) with a drying step after each application step (steps 30 and 50).

The total quantity of composition that is deposited preferably lies in the range 15 mg/cm$^2$ to 60 mg/cm$^2$, after drying in the stove, so as to obtain a coating of thickness lying in the range 50 micrometers (μm) to 250 μm.

Drying the colloidal suspension serves to form a coagulated solid that provides cohesion between the grains of powder and the other ingredients of the composition and that bonds the protective layer on the part. The intermediate drying, before depositing the following layer, enhances good uniformity of the overall resulting coating.

Drying is performed in air at a temperature of about 90° C. for one hour.

After the protective layer proper has been formed, it may be covered in a resin that is subsequently cured by heat treatment performed at a temperature that is a function of the nature of the resin. The resin may in particular be a carbon resin, e.g. a phenolic resin, or a ceramic precursor resin, e.g. a polycarbosilane (PCS) resin or a polysiloxane resin. Depositing and curing the resin serves to form a surface layer that protects and thus reinforces the retention of the protective layer against mechanical impacts, friction, erosion, etc.

Similarly, the retention of the protective layer may be reinforced by lapping-vitrification heat treatment of the layer at a temperature lying in the range 600° C. to 1000° C. in an inert atmosphere.

After drying the composition, and possibly after curing the resin or after lapping-vitrification, a part is obtained that has a self-healing protective layer comprising at least particles of silica coming from the colloidal suspension, from the boron and/or boron compound powder, from the silicon carbide powder, and from the powder of at least one ultra-refractory oxide. As explained below, these ingredients enable a protective coating to be formed that has a first self-healing phase constituted in the majority by a borosilicate system, and a second self-healing phase based on silicate and including at least one ultra-refractory oxide and a filler made of silicon carbide grains.

It should be observed that in the intended application the composition may be applied to all or to only a portion of the outside surface of a part. For example, with brake disks, the composition may be applied solely to surfaces other than the friction surface(s), and for the diverging portions of thruster nozzles, the composition may be applied only to the inside surface thereof.

The term "ultra-refractory" as applied to an oxide designates an oxide having a melting temperature higher than 2000° C.

The colloidal silica used in the form of an aqueous dispersion acts as a binder for the composition and serves to distribute the grains of the various powders substantially uniformly. Nevertheless, the silica also contributes to the function of protecting the part (healing and diffusion barrier) since it combines with the other glass-making species of the composition to form a diffusion barrier in the softened state. More precisely, at temperatures below about 1450° C., the silica co-operates with the boron to form a self-healing borosilicate glass of the [$B_2O_3$+$SiO_2$] type that wets carbon and thus forms a diffusion barrier. In addition, at temperatures higher than 1450° C., the silica co-operates with the ultra-refractory oxide(s) to form a self-healing glass of the [$SiO_2$+ultra-refractory oxide(s)] type that wets grains of silicon carbide.

The boron (elemental boron or a boron compound) provides the ability to wet carbon and contributes to forming the self-healing glass at temperatures below 1450° C.

The SiC powder serves to form a continuous protective film on the surface of the part to be protected at high temperatures, i.e. at temperatures higher than 1450° C. As explained above, as from those temperatures, the boron present in the protective layer has been consumed completely, thereby having the consequence of the $B_2O_3$ protective oxide and the agent that wets carbon disappearing. Under such conditions, it is no longer possible to form a continuous protective film at the surface of the part, in particular because of insufficient ability to wet carbon. As shown diagrammatically in FIG. 2, the grains of SiC serve to mitigate this loss of the ability to wet carbon since the self-healing glass formed at these temperatures ([$SiO_2$+ultra-refractory oxide(s)]) wets the grains of SiC present at the surface of the part that is to be protected, these grains themselves being held by being mechanically anchored in the pores in the surface of the part. Glass in the softened state spreads in the form of drops around the SiC grains. The size and the proximity of the SiC grains present at the surface of the part enable the drops of glass to be kept in contact with one another, thereby forming a continuous protective film at the surface of the part.

The mean grain size of the SiC powder is determined as a function of the mean size of the macroporosity presented by the part that is to be protected. In order to ensure that grains of SiC are properly anchored in the macropores, the grains must not be too large in size. Furthermore, the SiC grains must also have a size that is not too small so as to avoid them being subjected to oxidation too quickly (transformation of SiC into silica), which can lead to discontinuity in the protective film on the surface of the part. The minimum size of the SiC grains is also limited so as to avoid excessively increasing the viscosity of the composition for application. By way of example, the mean grain size of the SiC powder may lie in the range 5 μm to 50 μm.

By combining with the silica present in the protective layer, the ultra-refractory oxide(s) serve(s) to form a self-healing glass having a softening temperature around 1450° C. This forms a self-healing glass-making composition with viscosity that is appropriate for forming a diffusion barrier at temperatures where the protective effectiveness of borosilicate glass is no longer ensured.

The protective layer may also include silicon in powder form that constitutes an oxygen trap and a generator of silica.

The protective layer may also contain a precursor of self-healing borosilicate glass that participates, in addition to the silica and the boron already present in the protective layer, in the function of protecting the part at temperatures below 1450° C.

Finally, in addition to oxides of boron and silicon, the protective layer may include one or more oxides serving to adjust the temperature range in which the borosilicate glass presents viscous behavior so as to perform the protective function (healing and diffusion barrier). In particular, it is possible to use glass-modifier oxides such as oxides of alkali elements: $Na_2O$, $K_2O$, oxides of barium BaO, or of calcium CaO, or of magnesium MgO, zirconia $ZrO_2$, alumina $Al_2O_3$, lead monoxide PbO, an iron oxide, . . . .

An example of a modified borosilicate glass is constituted by a "Pyrex" glass powder from the US supplier Corning mainly having the following composition (percentages by weight):

| | |
|---|---:|
| $SiO_2$ | 80.60% |
| $B_2O_3$ | 12.60% |
| $Na_2O$ | 4.2% |
| $Al_2O_3$ | 2.25% |
| Cl | 0.1% |
| CaO | 0.1% |
| MgO | 0.05% |
| $Fe_2O_3$ | 0.04% |

Tests

In order to verify the effectiveness of the self-healing layer of the invention, samples of C/C composite were provided with a self-healing layer under the following conditions and were tested at high temperature (1500° C.).

The samples were C/C composite blocks constituted by carbon fiber reinforcement densified by a pyrolytic carbon matrix obtained by CVI.

The following compositions were prepared (proportions given as percentages by weight):

| Composition | A | B | C | D | E | F | G | H | I |
|---|---|---|---|---|---|---|---|---|---|
| Silica (Ludox ® AS40) | 49.1% | 63.5% | 45.6% | 45.6% | 45.6% | 45.6% | 49.1% | 49.1% | 38.2% |
| Boron powder | 7.5% | 9.7% | 7% | 7% | 7% | 7% | 7.5% | 7.5% | 48.9% ($TiB_2$) |
| Silicon powder | 7.5% | 9.7% | 7% | 7% | 7% | 7% | 7.5% | 7.5% | |
| SiC powder (7 μm) | | | | | | 28.1% | | | |
| SiC powder (9 μm) | 22.6% | | 28.1% | | | | 22.6% | 22.6% | |
| SiC powder (37 μm) | | | | 28.1% | | | | | |
| SiC powder (45 μm) | | | | | 28.1% | | | | |
| $Y_2O_3$ powder | 5.8% | 7.4% | 5.3% | 5.3% | 5.3% | 5.3% | | | |
| $HfO_2$ powder | | | | | | | 5.8% | | |
| $Al_2O_3$ powder | | | | | | | | 5.8% | |
| Pyrex powder | 7.5% | 9.7% | 7% | 7% | 7% | 7% | 7.5% | 7.5% | 12.8% |
| Surface density (in mg/cm$^2$) | 43 | 41 | 47 | 53 | 44 | 43 | 51 | 49 | 47 |
| Weight loss after oxidation for 1 hour in air at 1500° C. | 0% | −3.6% | 1.3% | 1.1% | 1.1% | 1.2% | −5.7% | −3.5% | −14% |

All of the compositions are applied to the parts by brush, in two successive layers and without additional treatment after drying at 90° C. It should be observed that the performance as described below was not modified when additional treatment was applied (cured resin coating or lapping).

Test 1

In this example, the same C/C composite samples were provided with self-healing layers. Each sample $E_A$, $E_B$, $E_C$, $E_D$, $E_E$, and $E_F$ was protected with a different coating obtained respectively by applying the compositions A, B, C, D, E, and F as specified above. All of the compositions were applied under the conditions specified above.

It should be observed that unlike the samples $E_A$, $E_C$, $E_D$, $E_E$, and $E_F$, the protective coating on sample $E_B$ did not contain any SiC powder.

FIG. 3 shows the relative weight variation measured after one hour's exposure to dry air at 1500° C.

Although all of the coatings of the tested samples contained the glass-making compositions required for providing protection at 1500° C., it can be seen that only sample $E_B$ suffered loss of weight.

This test shows the advantage of the SiC powder in causing a continuous protective film to be formed above 1450° C.

Test 2

In this example, the same C/C composite samples were provided with self-healing layers. Each sample $E_A$, $E_B$ and $E_I$ was protected by a different coating obtained respectively by applying compositions A, B, and I as described above. All of the compositions were applied under the conditions described above.

It should be observed that unlike sample $E_A$, the protective coating of sample $E_B$ did not contain any SiC powder, and the protective coating of sample $E_I$ contained no SiC powder and no ultra-refractory oxide.

Figure 4:
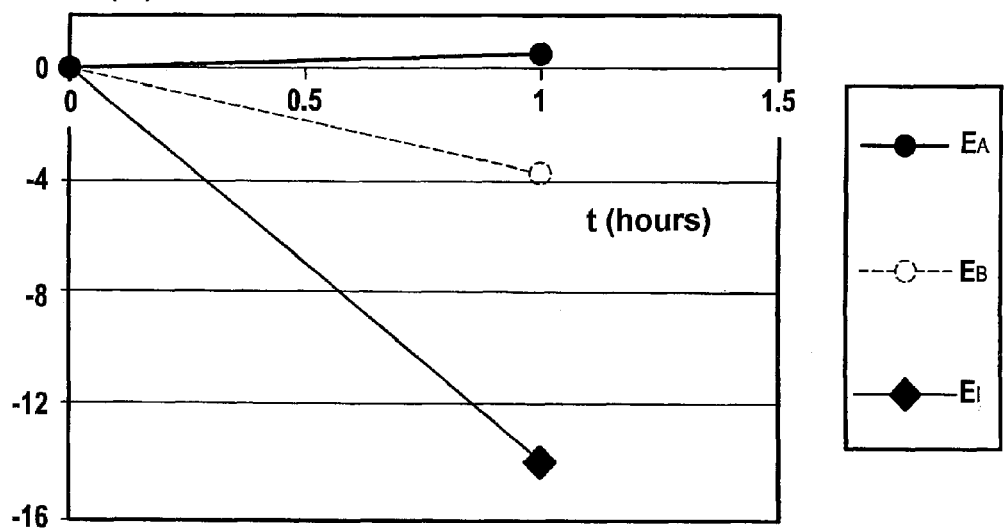

FIG. 4 shows relative weight variation as measured after one hour's exposure to dry air at 1500° C.

It can be seen that the weight loss was even greater for sample $E_I$ than for sample $E_B$.

This test shows the advantage of the ultra-refractory oxides in adapting the glass-making composition to the intended working temperature.

Test 3

In this example, the same C/C composite samples were provided with self-healing layers. Each sample $E_F$, $E_G$, and $E_M$ was protected by a different coating obtained respectively by applying above-specified compositions F, G, and H. All of the compositions were applied under the above-specified conditions.

It should be observed that the protective coatings of the samples all contained grains of SiC, but that they differed in that they contained different ultra-refractory oxides, namely $Y_2O_3$ for sample $E_F$, $HfO_2$ for sample $E_G$, and $Al_2O_3$ for sample $E_M$.

Figure 5:
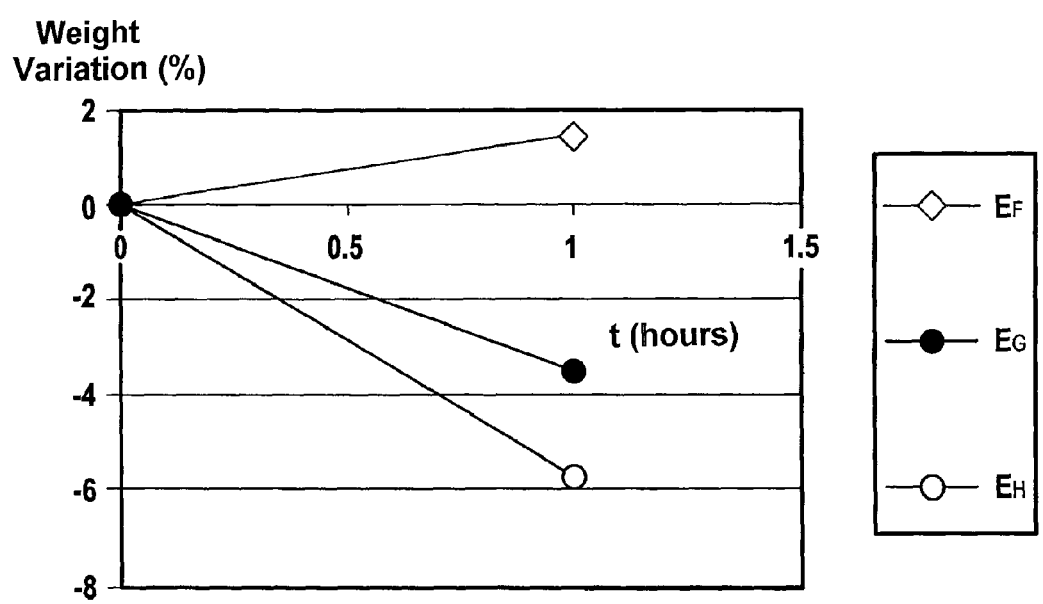

FIG. 5 shows the relative weight variation measured after one hour's exposure to dry air at 1500° C.

It can be seen that samples $E_G$ and $E_M$ lost weight.

This test shows that protection against oxidation at 1500° C. is more effective with $Y_2O_3$ than it is with $HfO_2$ or $Al_2O_3$.

The invention claimed is:

1. A composite material part having a protective coating against oxidation, the protective coating comprising:
   a first self-healing phase formed in a majority by a borosilicate system,
   a second self-healing phase based on silicate, and a filler formed by silicon carbide grains, wherein said second self-healing phase includes at least one ultra-refractory oxide, the at least one ultra-refractory oxide being $Y_2O_3$, wherein, in a softened state, the second self-healing phase based on silicate and including the at least one ultra-refractory oxide spreads in a form of drops and surrounds the silicon carbide grains, each drop surrounding a silicon carbide grain, so as to mitigate a loss of ability to wet carbon and maintain a protective film of the second self-healing phase in contact with a surface of the part.

2. A part according to claim 1, wherein the coating further includes silicon.

3. A part according to claim 1, wherein the coating further includes a borosilicate mixture.

4. A part according to claim 1, wherein the coating further includes at least one glass-modifier oxide.

5. A part according to claim 1, wherein the silicon carbide grains present mean size lying in the range 5 μm to 50 μm.

6. A part according to claim 1, further comprising a mechanical protection surface layer on the protective coating.

7. A part according to claim 1, wherein said part is a friction part made of carbon/carbon composite material.

8. A part according to claim 7, wherein said part is provided with the protective coating on its surfaces other than its friction surface(s).

9. A part according to claim 1, wherein said part is a diverging portion of a rocket engine nozzle made of carbon/carbon composite material with at least an inside surface thereof being provided with the protective coating.

* * * * *